(12) United States Patent
Koenig, II

(10) Patent No.: US 10,718,687 B2
(45) Date of Patent: Jul. 21, 2020

(54) INSPECTION UNIT FOR PHOTOCHROMIC OPHTHALMIC LENSES

(71) Applicant: Transitions Optical, Inc., Pinellas Park, FL (US)

(72) Inventor: Jerry L. Koenig, II, Largo, FL (US)

(73) Assignee: Transitions Optical, Inc., Pinellas Park, FL (US)

(*) Notice: Subject to any disclaimer, the term of this patent is extended or adjusted under 35 U.S.C. 154(b) by 104 days.

(21) Appl. No.: 15/737,794

(22) PCT Filed: Jun. 25, 2015

(86) PCT No.: PCT/US2015/037657
§ 371 (c)(1),
(2) Date: Dec. 19, 2017

(87) PCT Pub. No.: WO2016/209236
PCT Pub. Date: Dec. 29, 2016

(65) Prior Publication Data
US 2018/0299345 A1     Oct. 18, 2018

(51) Int. Cl.
*G01M 11/02* (2006.01)
*G01N 21/88* (2006.01)
*G01N 21/958* (2006.01)
*G01N 21/84* (2006.01)

(52) U.S. Cl.
CPC .... *G01M 11/0214* (2013.01); *G01M 11/0285* (2013.01); *G01N 21/8422* (2013.01); *G01N 21/8803* (2013.01); *G01N 21/958* (2013.01); *G01N 2021/8427* (2013.01); *G01N 2021/9583* (2013.01)

(58) Field of Classification Search
None
See application file for complete search history.

(56) References Cited

U.S. PATENT DOCUMENTS

| | | | | |
|---|---|---|---|---|
| 4,505,683 A | * | 3/1985 | Schurle | G01N 17/004 434/365 |
| 4,845,700 A | * | 7/1989 | Koizumi | G11B 17/035 720/615 |
| 9,690,021 B2 | | 6/2017 | Turpen et al. | |
| 2005/0007070 A1 | * | 1/2005 | Webb | H02J 7/0027 320/113 |
| 2006/0146532 A1 | * | 7/2006 | Austreng | G01J 3/10 362/248 |

(Continued)

FOREIGN PATENT DOCUMENTS

| | | | | |
|---|---|---|---|---|
| DE | 4410221 C1 | * | 7/1995 | C03B 33/03 |
| DE | 202014104530 U1 | * | 11/2014 | G01N 21/8803 |
| DE | 202014104530 U1 | | 11/2014 | |

(Continued)

*Primary Examiner* — Andrew Smyth
(74) *Attorney, Agent, or Firm* — The Webb Law Firm

(57) ABSTRACT

An inspection unit (10) for photochromic lenses (84) has a housing (12) defining an interior (14). At least one ultraviolet light source (32a, 32b) provides ultraviolet radiation into the housing interior (14). An inspection platform (54) is movable into and out of the housing interior (14) via at least one slide assembly (56). The inspection platform (54) includes a light table (58) having a translucent viewing area (62) and at least one inspection light source (64) located under the translucent viewing area (62).

14 Claims, 4 Drawing Sheets

(56) References Cited

U.S. PATENT DOCUMENTS

2013/0306883 A1    11/2013  Lim
2014/0265799 A1*  9/2014  Eichman ............... F25D 25/025
                                                          312/404

FOREIGN PATENT DOCUMENTS

| FR | 2966594 A1 * | 4/2012 | ............. G01N 21/29 |
| FR | 2966594 A1 | 4/2012 | |
| WO | 2015054041 A2 | 4/2015 | |

* cited by examiner

INSPECTION UNIT FOR PHOTOCHROMIC OPHTHALMIC LENSES

CROSS-REFERENCE TO RELATED APPLICATION

This application is the United States national phase of International Application No. PCT/US2015/037657 filed Jun. 25, 2015, which is incorporated herein by reference in its entirety.

BACKGROUND OF THE INVENTION

Field of the Invention

This invention relates generally to the inspection of photochromic coatings and, more particularly, to a device and method for inspecting photochromic coatings applied to ophthalmic lenses in a batch coating process.

Description of Related Art

A photochromic material changes color when irradiated with ultra-violet (UV) radiation and then returns to its original color when the irradiation ceases. One useful application of this phenomenon is in the manufacture of ophthalmic lenses capable of darkening when exposed to sunlight.

Conventional photochromic ophthalmic lenses are manufactured in large-scale, continuous manufacturing processes. In a "continuous process", large numbers of related materials are produced at the same time. For example, the same photochromic coating composition is deposited onto the surfaces of numerous lenses to produce a supply of similarly coated photochromic lenses. The lenses have the same aesthetics and functional characteristics.

The resultant photochromic lenses are inspected to ensure that the applied photochromic coating is commercially acceptable. By "commercially acceptable" is meant, for example, that the photochromic coating is aesthetically acceptable, e.g., the photochromic coating is evenly distributed across the surface of the lens, and/or that the photochromic coating is functionally acceptable, e.g., the photochromic coating has a desired color shift or desired color when activated, i.e., exposed to UV radiation.

For conventional large-scale continuous manufacturing processes, this inspection is done by placing the coated lenses onto a moving conveyor that transports the coated lenses under overhead ultraviolet (UV) lights. The ultraviolet lights activate the photochromic coating, causing the photochromic coating to darken or change color. The activated lenses are deposited on a large, open table and the lenses are visually inspected. In another conventional inspection process, the coated lenses are placed on a large table and a motorized UV light source is scanned above the table to activate the photochromic coatings for inspection.

Conventional continuous lens manufacturing processes provide the economies of scale associated with large-scale manufacturing processes. However, such large-scale processes are not well suited to making a small number of coated lenses having a wide variety of different coatings.

Recently, smaller scale batch manufacturing process have been contemplated for photochromic ophthalmic lenses. By "batch process" is meant the manufacture of small quantities of unrelated products at different times. These batch processes could be conducted using small-scale lens coaters located in the offices of doctors or eye-care specialists. For example, the doctor could stock a selection of clear ophthalmic lenses. When an ophthalmic lens prescription has been determined for a patient, the patient could select the type of photochromic coating (e.g., color or degree of shading) he or she would like on their lenses. The doctor could then apply the selected photochromic coating onto the lenses right in the office.

However, there still remains the need for the applied photochromic coating to be inspected to ensure that the photochromic coating has been successfully applied to the lens. The inspection systems used in conventional large-scale continuous lens manufacturing processes would not be practical for these small-scale batch manufacturing processes. The conventional systems are simply too large and heavy to be used in an office setting. Therefore, it would be desirable to provide a device and/or method that addresses the technical problem of inspecting a photochromic coating on an ophthalmic lens in a batch manufacturing process, for example, in a batch manufacturing process conducted in an office environment.

SUMMARY OF THE INVENTION

An inspection unit for photochromic lenses comprises a housing defining an interior. At least one ultraviolet light source is configured to radiate ultraviolet radiation into the interior of the housing. An inspection platform is movable into and out of the housing interior. The inspection platform comprises a light table comprising a translucent viewing area and at least one inspection light source located under the translucent viewing area.

A method of inspecting a photochromic lens in a batch manufacturing process, comprises: placing at least one photochromic lens onto an inspection platform of an inspection unit, wherein the inspection platform comprises a light table comprising a translucent viewing area and at least one inspection light source located under the translucent viewing area; inserting the inspection platform and the at least one photochromic lens into a housing interior having at least one ultraviolet radiation light source; withdrawing the inspection platform and the at least one photochromic lens from the housing interior; and inspecting the at least one photochromic lens on the translucent viewing area.

DESCRIPTION OF THE INVENTION

Figure 1:
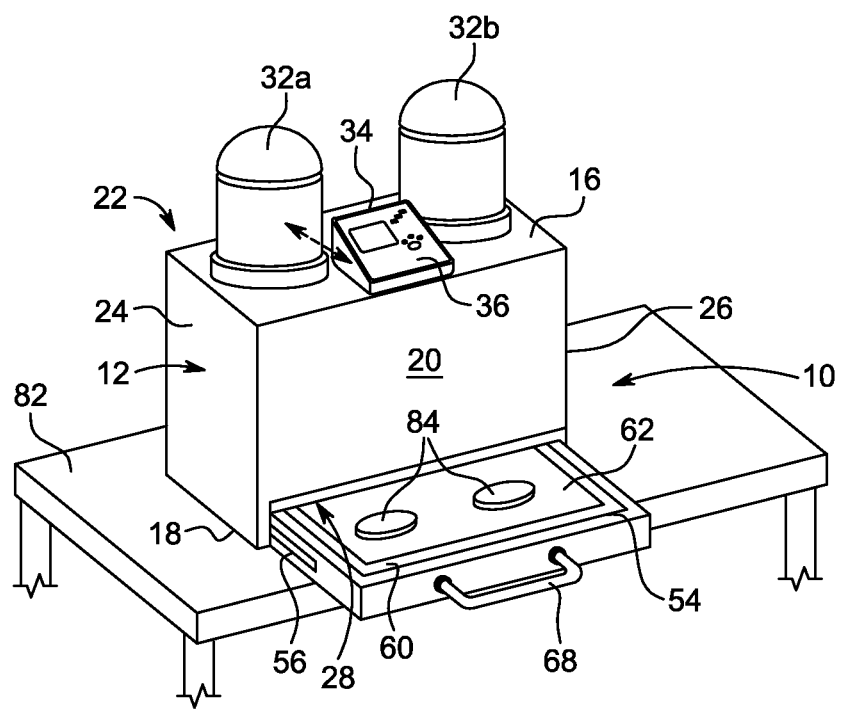
FIG. 1 is a left-front perspective view of an inspection unit of the invention.

Spatial or directional terms, such as "left", "right", "top", "bottom", and the like, relate to the invention as it is shown in the drawing figures. It is to be understood that the invention can assume various alternative orientations and, accordingly, such terms are not to be considered as limiting. All numbers used in the specification and claims are to be understood as being modified in all instances by the term "about". All ranges disclosed herein are to be understood to encompass the beginning and ending range values and any and all subranges subsumed therein. The ranges set forth herein represent the average values over the specified range.

The term "over" means "farther from the substrate". For example, a second layer located "over" a first layer means that the second layer is located farther from the substrate than the first layer. The second layer can be in direct contact with the first layer or one or more other layers can be located between the second layer and the first layer. By "layer" is meant a region of a composition distinctive from other regions. The terms "polymer" or "polymeric" include oligomers, homopolymers, copolymers, and terpolymers. The terms "ultraviolet radiation" or "ultraviolet light" mean electromagnetic energy having a wavelength in the range of 100 nanometers (nm) to less than 380 nm. The term "visible light" means electromagnetic energy having a wavelength in the range of 380 nm to 750 nm. The term "ophthalmic lens" means a prescription or non-prescription lens for eyewear. The term "photochromic lens" means a lens having a photochromic coating.

The invention comprises, consists of, or consists essentially of, the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

Figure 2:
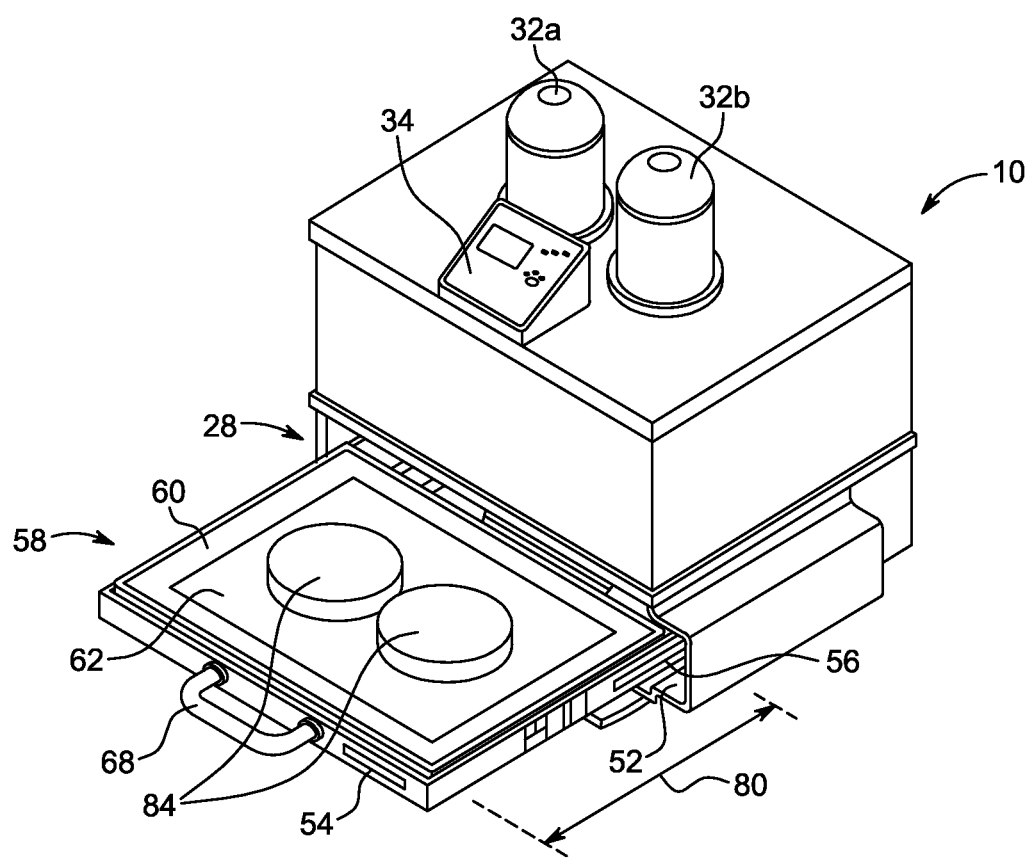
FIG. 2 is a right-front perspective view of the inspection unit of FIG. 1.
Figure 3:
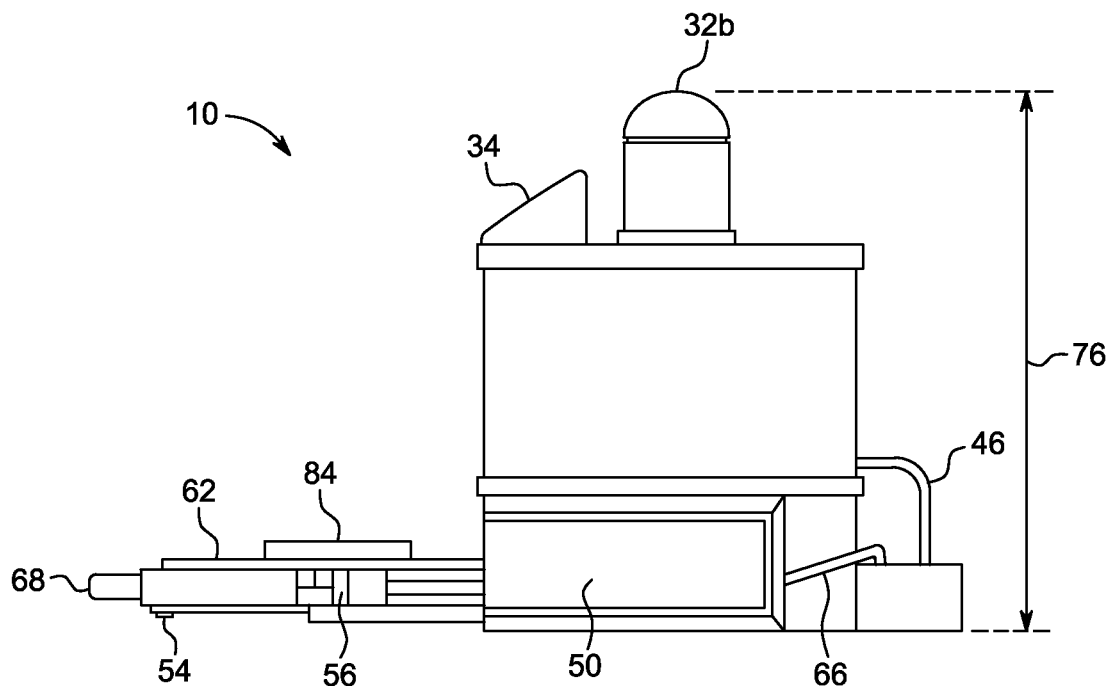
FIG. 3 is a side view of the inspection unit of FIG. 1.
Figure 4:
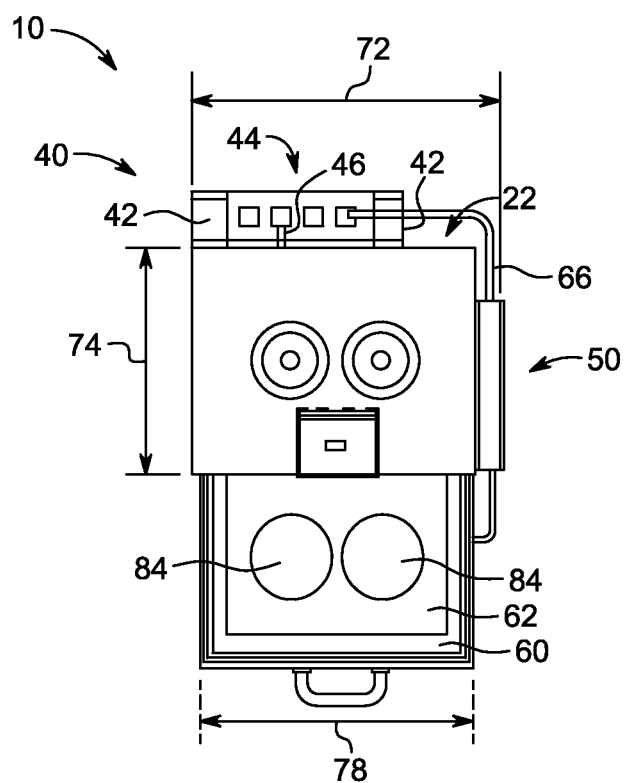
FIG. 4 is a top view of the inspection unit of FIG. 1.
Figure 5:
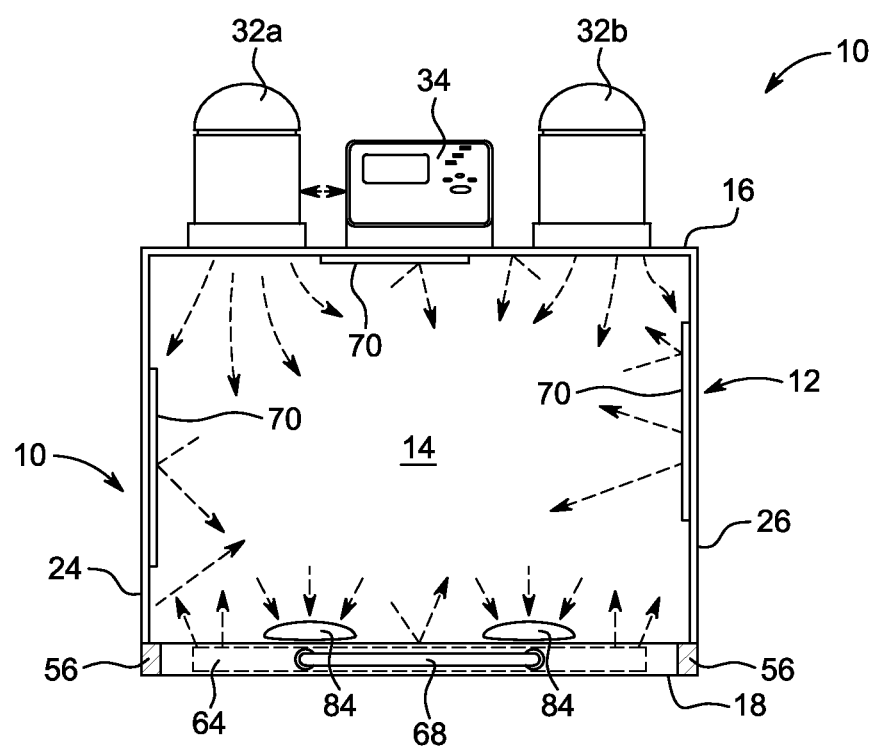
FIG. 5 is a front, cut-away view of the inspection unit of FIG. 1 showing the interior of the inspection unit.

An exemplary inspection unit 10 particularly well suited for use in a batch manufacturing process for photochromic ophthalmic lenses is shown in FIGS. 1-5. The inspection unit 10 includes a housing 12 having a hollow interior 14. The exemplary housing 12 includes a top 16, a bottom 18, a front 20, a rear 22, a left side 24, and a right side 26. The housing 12 includes an opening, such as an elongated opening 28, providing access to the interior 14 of the housing 12. The housing 12 may be of any suitable rigid material. For example, the housing 12 may be of wood, plastic, or metal. The exemplary housing 12 is illustrated as cuboid in shape. However, alternative shapes for the housing 12 may be used, such as spherical, pyramidal, or frustoconical.

At least one UV light source is located on the housing 12 and is positioned to radiate UV radiation into the interior 14 of the housing 12. In the illustrated example, two UV light sources 32a, 32b are mounted on the top 16 of the housing 12. The UV light sources 32a, 32b can comprise, for example, a conventional UV lamp or UV light-emitting diode (LED) located in a casing, such as a metal casing. The UV light sources 32a, 32b can radiate the same frequency or frequency range of UV light. Alternatively, one UV light source 32a can radiate one frequency or frequency range of UV light and the other UV light source 32b can radiate a different frequency or frequency range of UV light. The UV light sources 32a, 32b can be selectively activated based on the frequency or frequency range desired to activate a particular photochromic coating for inspection. The UV light sources 32a, 32b can be removably mounted on the housing 12. For example, the UV light sources 32a, 32b can be mounted on the housing 12 by a screw mount or bayonet mount. Thus, UV light sources of differing frequency or frequency range can be interchangeably connected to the housing 12 depending upon a desired frequency range to activate a photochromic lens.

The UV light sources 32a, 32b can be non-movably mounted on the housing 12. By "non-movably mounted" is meant that when the UV light sources 32a, 32b are connected to the housing, the angle of incidence of the UV radiation directed into the interior 14 of the housing 12 is fixed. Alternatively, one or more of the UV light sources 32a, 32b can be movably mounted, for example, tiltably mounted, on the housing 12. By "tiltably mounted" is meant that the UV light source 32a, 32b can be tilted or inclined with respect to the housing 12 to change the angle of incidence of the UV radiation directed into the interior 14 of the housing 12.

The inspection unit 10 includes a timing device 34. The timing device 34 may be integrally formed on the housing 12. Alternatively, the timing device 34 may be provided in a timer housing 36, for example extending from the top 16 of the housing 12. The timing device 34 may be a manually operated timer, such as a conventional stopwatch timer. The timing device 34 may be remotely operable. For example, operable from a control device, such as a cell phone, a tablet, a computer, or a control panel, located away from the inspection unit 10. The timing device 34 may be activated using a sensor, as described in more detail below.

A bracket assembly 40 (see FIG. 4) is mounted on the housing 12. In the illustrated example, the bracket assembly 40 is located on the rear 22 of the housing 12. The bracket assembly 40 can be, for example, a power strip holder comprising a pair of spaced brackets 42. The brackets 42 releaseably engage a conventional power strip 44. By "releaseably engage" is meant that the power strip 44 can be engaged with the brackets 42 to attach the power strip 44 to the housing 12 and disengaged from the brackets 42 to detach the power strip 44 from the housing 12. The UV light sources 32a, 32b can be connected to the power strip 44 by a conventional electric cable 46. The timing device 34 can be connected to the power strip 44 by a cable or the timing device 44 can be battery powered.

A cable guide 50 is connected to the housing 12. The cable guide 50 can be an elongated member having a hollow interior or channel 52. For example, the cable guide 50 can be a hollow rectangular member or a "U" shaped member connected to the housing 12. The cable guide 50 can be of the same material as the housing 12.

An inspection platform 54 is movably connected to the housing 12. In the illustrated example, the inspection platform 54 is connected to the housing 12 by one or more slide assemblies 56. The inspection platform 54 is slidable into and out of the housing interior 14 through the elongated opening 28 via the slide assemblies 56. The slide assemblies 56 can be, for example, conventional linear slides, ball slides, linear guide rails, or telescoping slide systems. The slide assemblies 56 can be metal slide assemblies, such as aluminum slide assemblies.

The inspection platform 54 comprises a light table 58. The light table 58 comprises a ply 60, such as a glass ply or plastic ply. The ply 60 can be a clear ply with a translucent viewing area 62. The translucent viewing area 62 can be integral with the ply 60, i.e., the ply 60 itself is translucent. For example, the ply 60 can be or can include frosted glass. Or, the translucent viewing area 62 can be a translucent sheet, such as a sheet of acrylic plastic, or a translucent coating, located on the ply 60. Alternatively, the ply 60 can be a translucent ply. By "translucent" is meant permitting light to pass through but diffusing or scattering the light.

At least one inspection light source 64 is located under the clear 60 ply, such as under the translucent viewing area 62. The inspection light source 64 can be connected to the power strip 44 by an electrical cable 66 extending through the cable guide 50. The inspection light source 64 can emit white light. By "white light" is meant light comprising a plurality of wavelengths of visible light. The inspection light source 64 can be, for example, a fluorescent light source, such as a conventional fluorescent tube or a compact florescent lamp.

Alternatively, the fluorescent light source 64 can include one or more light emitting diodes (LED). For example, one or more LED lighting strips or lighting bars.

A handle 68 is located on the inspection platform 54. The handle 68 assists in sliding the inspection platform 54 into and pulling it out of the interior 14 of the housing 12.

One or more inner surfaces of the housing 12 can be or can include a UV-reflective surface 70 to redirect the UV light from the light source 32a, 32b in a desired or predetermined direction. The reflective surface 70 may be integral with an inner surface of the housing 12. Or, the reflective surface 70 may be attached, such as adhesively attached, to one or more of the inner surfaces. Examples of suitable materials for the UV reflective surface 70 include reflective metals, such as aluminum or stainless steel; UV reflective coatings, such as coatings having UV reflective metallic layers, such as silver, gold, and copper layers; UV reflective tape; and UV reflective plastics. The reflective surfaces 70 assist in ensuring a uniform activation across the photochromic coating on the photochromic lens 84. The reflective surfaces 70 also assist in directing the UV light towards the photochromic lens 84, which can assist in reducing the amount of time that the photochromic lens 84 needs to be activated in the inspection unit 10.

The exemplary inspection unit 10 can have a width 72 of greater than 0 inches (0 cm) up to 25 inches (63.5 cm). For example, the exemplary inspection unit 10 can have a width 72 up to 20 inches (50.8 cm), such as up to 15 inches (38.1 cm), such as up to 14 inches (35.6 cm).

The exemplary inspection unit 10 can have a depth 74 of greater than 0 inches (0 cm) up to 20 inches (50.8 cm). For example, the exemplary inspection unit 10 can have a depth 74 up to 15 inches (38.1 cm), such as up to 12 inches (30.5 cm), such as up to 10 inches (25.4 cm).

The exemplary inspection 10 unit can have a height 76 of greater than 0 inches (0 cm) up to 25 inches (63.5 cm). For example, the exemplary inspection unit 10 can have a height 76 up to 20 inches (50.8 cm), such as up to 15 inches (38.1 cm), such as up to 13 inches (33 cm).

The exemplary inspection platform 54 can have a width 78 of greater than 0 inches (0 cm) up to 25 inches (63.5 cm). For example, the exemplary inspection platform 54 can have a width 78 up to 20 inches (50.8 cm), such as up to 15 inches (38.1 cm), such as up to 14 inches (35.6 cm).

The exemplary inspection platform 54 can have a depth 80 of greater than 0 inches (0 cm) up to 20 inches (50.8 cm). For example, the exemplary inspection platform 54 can have a depth 80 up to 15 inches (38.1 cm), such as up to 12 inches (30.5 cm), such as up to 10 inches (25.4 cm).

The exemplary inspection unit 10 can have a weight of greater than 0 pounds (0 kg) up to 30 pounds (13.6 kg). For example, the exemplary inspection unit 10 can have a weight of up to 25 pounds (11.3 kg), such as up to 20 pounds (9.1 kg), such as up to 15 pounds (6.8 kg).

The inspection unit 10 is a portable device particularly useful for office environments. For example, the inspection unit 10 can be placed on a table 82 in a doctor's office or eye-care store for use. The inspection unit 10 can then be stored in a closet or other location until needed again. The inspection unit 10 is easily portable between locations.

An exemplary method of inspecting a coated lens, for example a photochromic polymeric ophthalmic lens, using the inspection unit 10 will now be described.

One or more lenses, for example, polymeric ophthalmic lenses, are coated with a photochromic coating in a batch coating process to make a photochromic lens 84. One or more of the photochromic lenses 84 are placed onto the inspection platform 54. For example, onto the translucent viewing area 62.

One or more of the UV light sources 32a, 32b can be activated. For example, the UV light sources 32a, 32b can be manually activated by a conventional power switch. Alternatively, a sensor may be located on the inspection platform 54 to automatically activate the UV light sources 32a, 32b when the inspection platform 54 is inserted into the housing 12. The sensor can be, for example, a conventional magnetic switch or proximity sensor operatively connected to the UV light sources 32a, 32b.

An activation time can be manually input into the timing device 34. By "activation time" is meant the time the photochromic lens 84 is to be exposed to the UV radiation of the UV light sources 32a, 32b in the housing 12. The timing device 34 may have one or more preset activation times that can be chosen by an operator.

The inspection platform 54 is inserted into the housing 12 by pushing the inspection platform 54 into the interior 14 of the housing via the slide assemblies 56. In the housing interior 14, the photochromic lenses 84 are exposed to the UV radiation from the UV light sources 32a, 32b to activate the photochromic coating. After the activation time has elapsed, the inspection platform 54 is withdrawn from the interior 14 of the housing 12 via the slide assemblies 56.

The activation time can be, for example, in the range of 1 second to 30 seconds. For example, the activation time can be in the range of 1 second to 25 seconds, such as 1 second to 20 seconds, such as 1 second to 15 seconds. As will be appreciated by one skilled in the art, the activation time can vary based on, for example, the surface area of the photochromic coating on the photochromic lens 84, the thickness of the photochromic coating, the number of UV light sources used, and the presence or absence of reflective surfaces 70 on the inner surfaces of the housing 12.

The activated photochromic lenses 84 are visually inspected. For example, the activated photochromic lenses 84 can be inspected for aesthetic and/or functional acceptability, as discussed above. If the photochromic lenses 84 are acceptable, they can be incorporated into a pair of eyewear for the patient. If one or more of the photochromic lenses 84 are not acceptable, they can be discarded and one or more other clear ophthalmic lenses can be coated as a replacement.

In the above example, the inspection platform 54 is moved into and out of the housing 12 manually. However, the slide assemblies 56 could be powered slide assemblies 56, such as electrically powered slide assemblies 56. The powered slide assemblies 56 can slide the inspection platform 54 into and/or out of the housing 12 automatically, such as by activating a switch on the housing 12. Moreover, the powered slide assemblies 56 can be operatively connected to the timing device 34 such that when the activation time has expired, the powered slide assemblies 56 automatically slide the inspection platform 54 out of the interior 14 of the housing 12.

The inspection unit 10 is well suited for use in doctor's offices and eye-care specialists' stores. Due to the small footprint of the inspection unit 10, the inspection unit 10 may be used on a table 82 or counter in a doctor's office to allow a doctor or another individual to inspect photochromic lenses 84 coated in the office in a batch coating process. This provides an advantage over current photochromic coating inspection apparatuses and methods that utilize a large apparatus to inspect a large quantity of lenses simultaneously.

The invention can be further characterized in the following numbered clauses.

Clause 1: An inspection unit 10 for photochromic lenses 84 comprises a housing 12 defining an interior 14; at least one UV light source 32a, 32b configured to radiate ultraviolet radiation into the interior 14 of the housing 12; and an inspection platform 54 movable into and out of the housing interior 14, the inspection platform 54 comprising a light table 58 comprising a translucent viewing area 62 and at least one inspection light source 64 located under the translucent viewing area 62.

Clause 2: The inspection unit 10 of clause 1, wherein the housing 12 includes an opening, such as an elongated opening 28, providing access to the interior 14 of the housing 12.

Clause 3: The inspection unit 10 of clauses 1 or 2, wherein the housing 12 comprises a material selected from the group consisting of wood, plastic, and metal.

Clause 4: The inspection unit 10 of any of clauses 1 to 3, wherein the housing 12 has a shape selected from the group consisting of cuboid, spherical, pyramidal, and frustoconical.

Clause 5: The inspection unit 10 of any of clauses 1 to 4, wherein the inspection unit 10 includes a plurality of UV light sources 32a, 32b.

Clause 6: The inspection unit 10 of clause 5, wherein a first UV light source 32a radiates a first frequency or frequency range of UV light, and at least one other UV light source 32b radiates a second frequency or frequency range of UV light.

Clause 7: The inspection unit 10 of any of clauses 1 to 6, wherein the at least one UV light source 32a, 32b is removably mounted on the housing 12.

Clause 8: The inspection unit 10 of any of clauses 1 to 7, wherein the at least one UV light source 32a, 32b is movably mounted on the housing 12, such as tiltably mounted on the housing 12.

Clause 9: The inspection unit 10 of any of clauses 1 to 8, including a timing device 34 mounted on the housing 12.

Clause 10: The inspection unit 10 of any of clauses 1 to 9, including a bracket assembly 40 mounted on the housing 12.

Clause 11: The inspection unit 10 of any of clauses 1 to 10, including a cable guide 50 connected to the housing 12.

Clause 12: The inspection unit 10 of any of clauses 1 to 11, wherein the inspection platform 54 is connected to the housing 12 by at least one slide assembly 56.

Clause 13: The inspection unit 10 of clause 12, wherein the at least one slide assembly 56 comprises at least one linear slide assembly.

Clause 14: The inspection unit 10 of any of clauses 1 to 13, wherein the light table 58 comprises a ply 60, and the translucent viewing area 62 is integral with the ply 60.

Clause 15: The inspection unit 10 of any of clauses 1 to 13, wherein the light table 58 comprises a ply 60, and the translucent viewing area 62 is a sheet or coating located on the ply 60.

Clause 16: The inspection unit 10 of any of clauses 1 to 15, wherein the at least one inspection light source 64 emits white light.

Clause 17: The inspection unit 10 of any of clauses 1 to 16, wherein the at least one inspection light source 64 is selected from the group consisting of at least one fluorescent light source and at least one light emitting diode.

Clause 18: The inspection unit 10 of any of clauses 1 to 17, including at least one UV-reflective surface 70 in the interior 14 of the housing 12.

Clause 19: The inspection unit 10 of clause 18, wherein the at least one UV-reflective surface 70 is integral with an inner surface of the housing 12, or the at least one UV-reflective surface 70 is attached to an inner surface of the housing 12.

Clause 20: The inspection unit 10 of any of clauses 1 to 19, wherein the inspection unit 10 has a width 72 of greater than 0 inches (0 cm) up to 25 inches (63.5 cm), such as up to 20 inches (50.8 cm), such as up to 15 inches (38.1 cm), such as up to 14 inches (35.6 cm).

Clause 21: The inspection unit 10 of any of clauses 1 to 20, wherein the inspection unit 10 has a depth 74 of greater than 0 inches (0 cm) up to 20 inches (50.8 cm), such as up to 15 inches (38.1 cm), such as up to 12 inches (30.5 cm), such as up to 10 inches (25.4 cm).

Clause 22: The inspection unit 10 of any of clauses 1 to 21, wherein the inspection unit 10 has a height 76 of greater than 0 inches (0 cm) up to 25 inches (63.5 cm), such as up to 20 inches (50.8 cm), such as up to 15 inches (38.1 cm), such as up to 13 inches (33 cm).

Clause 23: The inspection unit 10 of any of clauses 1 to 22, wherein the inspection platform 54 has a width 78 of greater than 0 inches (0 cm) up to 25 inches (63.5 cm), such as up to 20 inches (50.8 cm), such as up to 15 inches (38.1 cm), such as up to 14 inches (35.6 cm).

Clause 24: The inspection unit 10 of any of clauses 1 to 23, wherein the inspection platform 54 has a depth 80 of greater than 0 inches (0 cm) up to 20 inches (50.8 cm), such as up to 15 inches (38.1 cm), such as up to 12 inches (30.5 cm), such as up to 10 inches (25.4 cm).

Clause 25: The inspection unit 10 of any of clauses 1 to 24, wherein the inspection unit 10 has a weight of greater than 0 pounds (0 kg) up to 30 pounds (13.6 kg), such as up to 25 pounds (11.3 kg), such as up to 20 pounds (9.1 kg), such as up to 15 pounds (6.8 kg).

Clause 26: A method of inspecting a photochromic lens 84 in a batch manufacturing process comprises placing at least one photochromic lens 84 onto an inspection platform 54 of an inspection unit 10, wherein the inspection platform 54 comprises a light table 58 comprising a translucent viewing area 62 and at least one inspection light source 64 located under the translucent viewing area 62; inserting the inspection platform 54 and the at least one photochromic lens 84 into a housing interior 14 including at least one ultraviolet radiation light source 32a, 32b; withdrawing the inspection platform 54 and the at least one photochromic lens 84 from the housing interior 14; and inspecting the at least one photochromic lens 84 on the translucent viewing area 62.

Clause 27: The method of clause 26, including manually activating the at least one UV light source 32a, 32b.

Clause 28: The method of clause 26, wherein the at least one UV light source 32a, 32b is automatically activated when the inspection platform 54 is inserted into the housing 12.

Clause 29: The method of any of clauses 26 to 28, including manually activating the timing device 34.

Clause 30: The method of any of clauses 26 to 29, including withdrawing the inspection platform 54 from the housing 12 when an activation time has elapsed.

It will be readily appreciated by those skilled in the art that modifications, as indicated above, may be made to the invention without departing from the concepts disclosed in the foregoing description. Accordingly, the particular aspects described in detail herein are illustrative only and are not limiting to the scope of the invention, which is to be given the full breadth of the appended claims and any and all equivalents thereof.

The invention claimed is:

1. An inspection unit for photochromic lenses, comprising:
   a housing defining an interior;
   at least one ultraviolet light source configured to radiate ultraviolet radiation into the interior of the housing; and
   an inspection platform movable into and out of the housing interior through an elongated opening in the housing via a pair of spaced slide assemblies, the inspection platform comprising a light table comprising a translucent viewing area and at least one inspection light source located under the translucent viewing area,
   wherein the inspection platform is withdrawn from the housing during inspection of the photochromic lenses.

2. The inspection unit of claim 1, including a timing device located on the housing.

3. The inspection unit of claim 1, including a bracket assembly connected to the housing.

4. The inspection unit of claim 3, wherein the bracket assembly comprises a pair of spaced brackets configured to releaseably engage a power strip.

5. The inspection unit of claim 1, including a cable guide connected to the housing.

6. The inspection unit of claim 5, wherein the cable guide comprises an elongated member having a channel.

7. The inspection unit of claim 1, wherein the housing has a width of less than or equal to 50.8 cm, a depth of less than or equal to 38.1 cm, and a height of less than or equal to 50.8 cm.

8. The inspection unit of claim 1, wherein the inspection unit has a weight of less than or equal to 11.3 kg.

9. The inspection unit of claim 1, including at least one ultraviolet radiation reflective surface in the housing interior.

10. The inspection unit of claim 1, wherein a timing device is located on the housing, wherein a bracket assembly is connected to the housing, wherein a cable guide is connected to the housing, wherein the housing has a width of less than or equal to 50.8 cm, a depth of less than or equal to 38.1 cm, and a height of less than or equal to 50.8 cm, and wherein the inspection unit has a weight of less than or equal to 11.3 kg.

11. A method of inspecting a photochromic lens in a batch manufacturing process, comprising:
   placing at least one photochromic lens onto an inspection platform of an inspection unit, wherein the inspection platform comprises a light table comprising a translucent viewing area and at least one inspection light source located under the translucent viewing area;
   inserting the inspection platform and the at least one photochromic lens into a housing interior through an elongated opening in the housing via a pair of spaced slide assemblies, the housing interior including at least one ultraviolet radiation light source;
   withdrawing the inspection platform and the at least one photochromic lens from the housing interior; and
   inspecting the at least one photochromic lens on the translucent viewing area with the inspection platform in a withdrawn position.

12. The method of claim 11, wherein the inspection unit includes a timing device and the method comprises:
   inputting an activation time period into the timing device; and
   withdrawing the inspection platform and the at least one photochromic lens from the housing interior when the activation time period expires.

13. The inspection unit of claim 1, wherein each of the pair of spaced slide assemblies is one of a linear slide, a ball slide, a linear guide rail, or a telescoping slide system.

14. The method of claim 11, wherein each of the pair of spaced slide assemblies is one of a linear slide, a ball slide, a linear guide rail, or a telescoping slide system.

* * * * *